(12) United States Patent
Chen

(10) Patent No.: US 10,817,241 B2
(45) Date of Patent: Oct. 27, 2020

(54) MULTI-FRAME DISPLAY METHOD APPLIED TO A DISPLAY DEVICE INCLUDING A CURVED SURFACE DISPLAY SCREEN

(71) Applicants: HKC Corporation Limited, Shenzhen, Guangdong (CN); Chongqing HKC Optoelectronics Technology Co., Ltd., Chongqing (CN)

(72) Inventor: Yu-jen Chen, Chongqing (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 16/462,055

(22) PCT Filed: Dec. 28, 2017

(86) PCT No.: PCT/CN2017/119188
§ 371 (c)(1),
(2) Date: May 17, 2019

(87) PCT Pub. No.: WO2018/121638
PCT Pub. Date: Jul. 5, 2018

(65) Prior Publication Data
US 2019/0333469 A1    Oct. 31, 2019

(30) Foreign Application Priority Data
Dec. 30, 2016    (CN) .......................... 2016 1 1265522

(51) Int. Cl.
*G06F 3/14*    (2006.01)
*G06F 3/16*    (2006.01)
(Continued)

(52) U.S. Cl.
CPC .......... *G06F 3/1446* (2013.01); *G06F 1/1652* (2013.01); *G06F 3/033* (2013.01);
(Continued)

(58) Field of Classification Search
CPC ................... G06F 3/1446; G06F 3/165; G06F 2203/04803; G09G 2320/0261;
(Continued)

(56) References Cited

U.S. PATENT DOCUMENTS 9,098,240 B2    8/2015    Kim et al.
9,122,319 B2    9/2015    Kwak et al.
(Continued)

FOREIGN PATENT DOCUMENTS

CN    1791198 A    6/2006
CN    1791198 A    6/2006
(Continued)

OTHER PUBLICATIONS

International Search Report dated Apr. 4, 2018 in Application No. PCT/CN2017/120048.
(Continued)

*Primary Examiner* — Ryan A Lubit
(74) *Attorney, Agent, or Firm* — Muncy, Geissler, Olds & Lowe, P.C.

(57) ABSTRACT

A multi-frame display method applied to a display device. The method includes: when performing a bending split screen on a curved surface display screen according to a predetermined fold line, acquiring a first position information of the predetermined fold line on the screen, wherein at least two curved surface display screens face different orientations; dividing a display interface of the screen into a plurality of first display sub-interfaces according to the first position information; when drawing a track on the first display sub-interface, acquiring a second position information of the track in the first display sub-interface; dividing a display interface of the first display sub-interface into two second display sub-interfaces according to the second position information; acquiring display contents in the first or
(Continued)

second display sub-interfaces selected by the user; and displaying the display content selected in the first or second display sub-interface through the first or second display sub-interface.

8 Claims, 8 Drawing Sheets

(51) Int. Cl.
| | |
|---|---|
| G06F 3/033 | (2013.01) |
| G06F 3/0482 | (2013.01) |
| G06F 3/0488 | (2013.01) |
| G06F 1/16 | (2006.01) |
| H04N 21/431 | (2011.01) |
| H04N 21/41 | (2011.01) |
| H04N 21/43 | (2011.01) |
| G09F 9/30 | (2006.01) |
| G09F 9/302 | (2006.01) |
| G09G 5/00 | (2006.01) |
| G09G 5/14 | (2006.01) |

(52) U.S. Cl.
CPC ........ *G06F 3/0482* (2013.01); *G06F 3/04886* (2013.01); *G06F 3/16* (2013.01); *G06F 3/165* (2013.01); *G09F 9/301* (2013.01); *G09F 9/3023* (2013.01); *G09F 9/3026* (2013.01); *G09G 5/006* (2013.01); *G09G 5/14* (2013.01); *H04N 21/4122* (2013.01); *H04N 21/431* (2013.01); *H04N 21/4307* (2013.01); *G06F 2203/04803* (2013.01); *G09G 2320/0261* (2013.01); *G09G 2340/14* (2013.01); *G09G 2354/00* (2013.01); *G09G 2360/04* (2013.01); *G09G 2380/02* (2013.01)

(58) Field of Classification Search
CPC .......... G09G 2354/00; G09G 2380/02; H04N 21/431; H04N 21/4307; H04N 21/4122; H04N 21/439
See application file for complete search history.

(56) References Cited

U.S. PATENT DOCUMENTS

| | | | |
|---|---|---|---|
| 9,343,342 B2 | 5/2016 | Lee et al. | |
| 9,383,776 B2 | 7/2016 | Choi | |
| 9,639,175 B2 | 5/2017 | Cho et al. | |
| 9,747,015 B2 | 8/2017 | Forutanpour et al. | |
| 9,933,643 B2 | 4/2018 | Chong et al. | |
| 9,941,918 B2 | 4/2018 | Kim et al. | |
| 9,959,030 B2 | 5/2018 | Sang et al. | |
| 10,061,346 B2 | 8/2018 | Aurongzeb et al. | |
| 10,360,876 B1 | 7/2019 | Rahman | |
| 10,380,976 B2 | 8/2019 | Chen | |
| 10,416,950 B2 | 9/2019 | Kim et al. | |
| 2004/0008191 A1 | 1/2004 | Poupyrev et al. | |
| 2009/0201443 A1 | 8/2009 | Sasaki et al. | |
| 2010/0124879 A1 | 5/2010 | Cohen et al. | |
| 2012/0075166 A1 | 3/2012 | Marti et al. | |
| 2012/0235893 A1 | 9/2012 | Phillips et al. | |
| 2012/0235894 A1 | 9/2012 | Phillips | |
| 2013/0207946 A1 | 8/2013 | Kim et al. | |
| 2013/0229324 A1 | 9/2013 | Zhang et al. | |
| 2013/0346912 A1* | 12/2013 | Buening ............... | G06F 3/0482 715/783 |
| 2014/0049464 A1 | 2/2014 | Kwak et al. | |
| 2014/0071657 A1 | 3/2014 | Sekiguchi et al. | |
| 2014/0218321 A1 | 8/2014 | Lee et al. | |
| 2014/0267905 A1 | 9/2014 | Lee et al. | |
| 2015/0009125 A1 | 1/2015 | Kim et al. | |
| 2015/0022732 A1 | 1/2015 | Park | |
| 2015/0029166 A1* | 1/2015 | Park ................. | H04N 5/4403 345/184 |
| 2015/0185968 A1 | 7/2015 | Kim et al. | |
| 2015/0286457 A1* | 10/2015 | Kim ................... | G02B 6/0078 345/581 |
| 2015/0301672 A1 | 10/2015 | Kim et al. | |
| 2015/0370317 A1 | 12/2015 | Cha | |
| 2016/0078592 A1 | 3/2016 | Kim et al. | |
| 2016/0109973 A1 | 4/2016 | Kim et al. | |
| 2016/0187994 A1* | 6/2016 | La ....................... | G06F 1/1677 345/619 |
| 2016/0195938 A1 | 7/2016 | Kim et al. | |
| 2016/0259514 A1 | 9/2016 | Sang et al. | |
| 2016/0269671 A1 | 9/2016 | Choi et al. | |
| 2016/0283014 A1 | 9/2016 | Rider et al. | |
| 2016/0357221 A1 | 12/2016 | Huh | |
| 2016/0372083 A1 | 12/2016 | Taite et al. | |
| 2017/0052566 A1 | 2/2017 | Ka et al. | |
| 2017/0155087 A1 | 6/2017 | Lee et al. | |
| 2017/0199549 A1 | 7/2017 | Yeom | |
| 2018/0293960 A1 | 10/2018 | Chen | |
| 2019/0172422 A1 | 6/2019 | Chen | |
| 2019/0191523 A1 | 6/2019 | Gawel et al. | |
| 2019/0333474 A1 | 10/2019 | Chen | |

FOREIGN PATENT DOCUMENTS

| | | |
|---|---|---|
| CN | 103197879 A | 7/2013 |
| CN | 103197879 A | 7/2013 |
| CN | 103295510 A | 9/2013 |
| CN | 103295510 A | 9/2013 |
| CN | 103677569 A | 3/2014 |
| CN | 103677569 A | 3/2014 |
| CN | 103677727 A | 3/2014 |
| CN | 103777727 A | 5/2014 |
| CN | 104598079 A | 5/2015 |
| CN | 104598079 A | 5/2015 |
| CN | 104615393 A | 5/2015 |
| CN | 104615393 A | 5/2015 |
| CN | 105204800 A | 12/2015 |
| CN | 105204800 A | 12/2015 |
| CN | 105404060 A | 3/2016 |
| CN | 105404060 A | 3/2016 |
| CN | 105677228 A | 6/2016 |
| CN | 105677228 A | 6/2016 |
| CN | 105938426 A | 9/2016 |
| CN | 105955402 A | 9/2016 |
| CN | 105955402 A | 9/2016 |
| CN | 106020760 A | 10/2016 |
| CN | 106020760 A | 10/2016 |
| CN | 106200803 A | 12/2016 |
| CN | 106200803 A | 12/2016 |
| CN | 106686423 A | 5/2017 |
| CN | 106686423 A | 5/2017 |
| CN | 107024810 A | 8/2017 |
| CN | 107024810 A | 8/2017 |
| CN | 105204800 B * | 11/2018 |
| WO | WO 2016003101 A1 | 1/2016 |

OTHER PUBLICATIONS

International Search Report dated Mar. 23, 2018 in Application No. PCT/CN2017/120043.
International Search Report dated Apr. 4, 2018 in Application No. PCT/CN2017/120050.
U.S. Appl. No. 15/577,786, filed Nov. 29, 2017.
U.S. Appl. No. 16/309,859, filed Dec. 13, 2018.
U.S. Appl. No. 16/309,944, filed Dec. 14, 2018.
U.S. Appl. No. 16/310,105, filed Dec. 14, 2018.
U.S. Appl. No. 16/341,705, filed Apr. 12, 2019.
U.S. Appl. No. 16/342,032, filed Apr. 15, 2019.
U.S. Appl. No. 16/341,754, filed Apr. 12, 2019.
U.S. Appl. No. 16/342,077, filed Apr. 15, 2019.
U.S. Appl. No. 16/342,136, filed Apr. 15, 2019.

* cited by examiner

MULTI-FRAME DISPLAY METHOD APPLIED TO A DISPLAY DEVICE INCLUDING A CURVED SURFACE DISPLAY SCREEN

BACKGROUND

Technical Field

This disclosure relates to a technical field of a display, and more particularly to a multi-frame display method and a display device.

Related Art

At present, more and more liquid crystal panels require the use of curved surface displays. Because the curved surface display has brought different experiences to consumers, the curved surface display has gradually become a new development direction in the industry, wherein a flexible (the curvature can be arbitrarily changed) curved surface display gets the user's favor much more. However, many users can only watch the same screen content at the same time using the existing curved surface display, and a plurality of users can watch different frame contents at the same time using the existing multi-screen display technology or PBP technology. However, because frame contents of the curved surface screen interfere with each other, there is no better visual experience.

In addition, the frame presented by the existing multi-screen display technology or PBP technology can only face one orientation. When the users want to watch the frame together, in order to see the display content clearly, they may need to gather to the location corresponding to the middle of the frame to clearly watch the screen, and this creates an uncomfortable watching experience. When many users simultaneously want to watch the frame together, some users may be located on both sides of the middle of the frame, and the frame contents may not be clearly seen due to the inability to face the middle of the frame.

SUMMARY

In view of the insufficient of prior art, the inventor obtained this application after research and development. An embodiment of this disclosure provides a multi-frame display method and a display device to achieve the effect that different users can use the same display screen to watch different frame contents, which do not interfere with each other. In addition, a plurality of curved surface display screens face different orientations, respectively, so that the watching experiences for multiple users can be improved while watching at the same time. Moreover, the disclosure can achieve the effect that the same display interface is used to simultaneously watch different frame contents according to the track that the user touches the display screen, thereby providing the user with a good operating and viewing experience.

In a first aspect, the disclosure provides a multi-frame display method applied to a display device including a curved surface display screen, comprising: when detecting that a user performs a bending split screen on the curved surface display screen according to a predetermined fold line, acquiring a first position information of the predetermined fold line on the curved surface display screen, wherein the bending split screen is to bend the curved surface display screen into at least two curved surface display screens according to the predetermined fold line, and the curved surface display screens face different orientations, respectively; dividing a display interface of the curved surface display screen into a plurality of first display sub-interfaces according to the first position information, wherein a split screen line of two adjacent first display sub-interfaces coincides with the predetermined fold line; when detecting that the user draws a track on the first display sub-interface, acquiring a second position information of the track in the first display sub-interface, wherein the track divides the first display sub-interface into two display areas; dividing a display interface of the first display sub-interface into two second display sub-interfaces according to the second position information, wherein the track is a separating line of the two second display sub-interfaces; acquiring display contents in the first display sub-interfaces or the second display sub-interfaces selected by the user; and displaying the display content selected in the first display sub-interface or the second display sub-interface through the first display sub-interface or the second display sub-interface.

In the multi-frame display method of the disclosure, before acquiring the first position information of the predetermined fold line on the curved surface display screen, the multi-frame display method further comprises: determining whether a multi-screen display function of the curved surface display screen is selected; and if the multi-screen display function of the curved surface display screen is selected, acquiring the first position information of the predetermined fold line on the curved surface display screen.

In the multi-frame display method of the disclosure, the predetermined fold line is a vertical fold line, and the display screen corresponding to the predetermined fold line protrudes from the curved surface display screen.

In the multi-frame display method of the disclosure, the step of acquiring the first position information of the predetermined fold line on the curved surface display screen comprises: acquiring a corresponding column pixel unit of the vertical fold line in the curved surface display screen.

In the multi-frame display method of the disclosure, a sensor is provided to detect whether to perform the bending split screen on the curved surface display screen, and when a value detected by the sensor reaches a predetermined threshold value range, the bending split screen on the curved surface display screen is performed based on the predetermined fold line.

In the multi-frame display method of the disclosure, the sensor is a pressure sensor or a distance sensor.

In the multi-frame display method of the disclosure, before the step of acquiring the second position information of the track in the first display sub-interface, the multi-frame display method further comprises: determining whether a multi-frame display function of the first display sub-interface is selected; and if the multi-frame display function of the first display sub-interface is selected, acquiring the second position information of the track in the first display sub-interface.

In the multi-frame display method of the disclosure, the step of acquiring the second position information of the track in the first display sub-interface comprises acquiring a corresponding pixel unit of the track in the first display sub-interface.

In the multi-frame display method of the disclosure, the curved surface display screen is a touch display screen, and when the user draws a track on the first display sub-interface, a display interface of the first display sub-interface is divided into two second display sub-interfaces based on the track.

In a second aspect, this disclosure provides a display device comprising a curved surface display screen, a first acquiring module, a dividing module, a second acquiring module and a display module. The first acquiring module acquires a first position information of the predetermined fold line on the curved surface display screen when detecting that a user performs a bending split screen on the curved surface display screen according to a predetermined fold line. The bending split screen is to bend the curved surface display screen into at least two curved surface display screens according to the predetermined fold line, and the curved surface display screens face different orientations, respectively. The first acquiring module further acquires a second position information of the track in the first display sub-interface, when detecting that the user draws a track on the first display sub-interface. The track divides the first display sub-interface into two display areas. The dividing module divides a display interface of the curved surface display screen into a plurality of first display sub-interfaces according to the first position information. A split screen line of two adjacent first display sub-interfaces coincides with the predetermined fold line. The dividing module further divides a display interface of the first display sub-interface into two second display sub-interfaces according to the second position information, and the track is a separating line of the two second display sub-interfaces. The second acquiring module acquires display contents in the first display sub-interfaces or the second display sub-interfaces selected by the user. The display module displays the display content selected in the first display sub-interface or the second display sub-interface through the first display sub-interface or the second display sub-interface.

In the display device of this disclosure, the display device further comprises a first judging module judging whether a multi-screen display function of the curved surface display screen is selected, and when the multi-screen display function is selected, the first acquiring module acquires the first position information of the predetermined fold line on the curved surface display screen.

In the display device of this disclosure, the predetermined fold line is a vertical fold line, and the display screen corresponding to the predetermined fold line protrudes from the curved surface display screen.

In the display device of this disclosure, the first acquiring module acquires a corresponding column pixel unit of the vertical fold line in the curved surface display screen.

In the display device of this disclosure, a sensor is provided to detect whether to perform the bending split screen on the curved surface display screen, and when a value detected by the sensor reaches a predetermined threshold value range, the bending split screen on the curved surface display screen is performed based on the predetermined fold line.

In the display device of this disclosure, the sensor is a pressure sensor or a distance sensor.

In the display device of this disclosure, the display device further comprises a first judging module judging whether a multi-frame display function of the first display sub-interface is selected, and when the multi-frame display function of the first display sub-interface is selected, the first acquiring module acquires the second position information of the track in the first display sub-interface.

In the display device of this disclosure, the first acquiring module acquires a corresponding pixel unit of the track in the first display sub-interface.

In the display device of this disclosure, the curved surface display screen is a touch display screen, and when the user draws a track on the first display sub-interface, a display interface of the first display sub-interface is divided into two second display sub-interfaces based on the track.

In the display device of this disclosure, the display device further comprises a second judging module, a selecting module and an output module. The second judging module judges whether there is audio information in the display content. The selecting module selects one of a plurality of audio channels used by the curved surface display screen if the display content includes the audio information. The output module outputs the audio information through the selected audio channel.

In a third aspect, the disclosure provides a display device comprising a curved surface display screen, a first judging module, a first acquiring module, a dividing module, a second acquiring module, a display module, a second judging module, a selecting module and an output module. The first judging module judges whether a multi-screen display function of the curved surface display screen is selected and judges whether a multi-frame display function of the first display sub-interface is selected. The first acquiring module acquires a first position information of the predetermined fold line on the curved surface display screen when detecting that a user performs a bending split screen on the curved surface display screen according to a predetermined fold line. The bending split screen is to bend the curved surface display screen into at least two curved surface display screens according to the predetermined fold line, and the curved surface display screens face different orientations, respectively. The predetermined fold line is a vertical fold line. The first acquiring module acquires a corresponding column pixel unit of the vertical fold line in the curved surface display screen. The first acquiring module further acquires a second position information of the track in the first display sub-interface. When detecting that the user draws a track on the first display sub-interface, the track divides the first display sub-interface into two display areas. The first acquiring module acquires a corresponding pixel unit of the track in the first display sub-interface. The dividing module divides a display interface of the curved surface display screen into a plurality of first display sub-interfaces according to the first position information. A split screen line of two adjacent first display sub-interfaces coincides with the predetermined fold line. The dividing module further divides a display interface of the first display sub-interface into two second display sub-interfaces according to the second position information, and the track is a separating line of the two second display sub-interfaces. The second acquiring module acquires display contents in the first display sub-interfaces or the second display sub-interfaces selected by the user. The display module displays the display content selected in the first display sub-interface or the second display sub-interface through the first display sub-interface or the second display sub-interface. The second judging module judges whether there is audio information in the display content. The selecting module selects one of a plurality of audio channels used by the curved surface display screen if the display content includes the audio information. The output module outputs the audio information through the selected audio channel.

In the embodiment of this disclosure, a physical bending split screen mode is performed on a curved surface display screen according to a predetermined fold line by a user. In software, a display interface split screen corresponding to the physical bending split screen mode is employed to divide the curved surface display screen into a plurality of first display sub-interfaces, and the different first display sub-interfaces may display the same or different contents, thereby achieving the effect that multiple users can watch the same or different frame contents at the same time. In addition, because at least two curved surface display screens face different orientations, respectively, more users can simultaneously watch the display contents facing different orientations. This disclosure may be applicable to, for example, a billboard or a display screen of a concert or an exhibition to make more observers clearly watch the different orientations of advertising, singing or exhibition contents, and improve the watching experiences for multiple users while watching at the same time.

In addition, in the embodiment of this disclosure, the multi-frame display method is performed on the curved surface display screen according to the drawn track through the user touching the curved surface display screen. In software, a display interface split screen corresponding to the multi-frame display method is employed to divide the first display sub-interface into two second display sub-interfaces, and different second display sub-interfaces display the same or different contents, thereby achieving the effect that the same display interface is used to simultaneously watch different frame contents according to the track that the user touches the display screen, and providing the user with a good operating and viewing experience.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE DISCLOSURE

Figure 1:
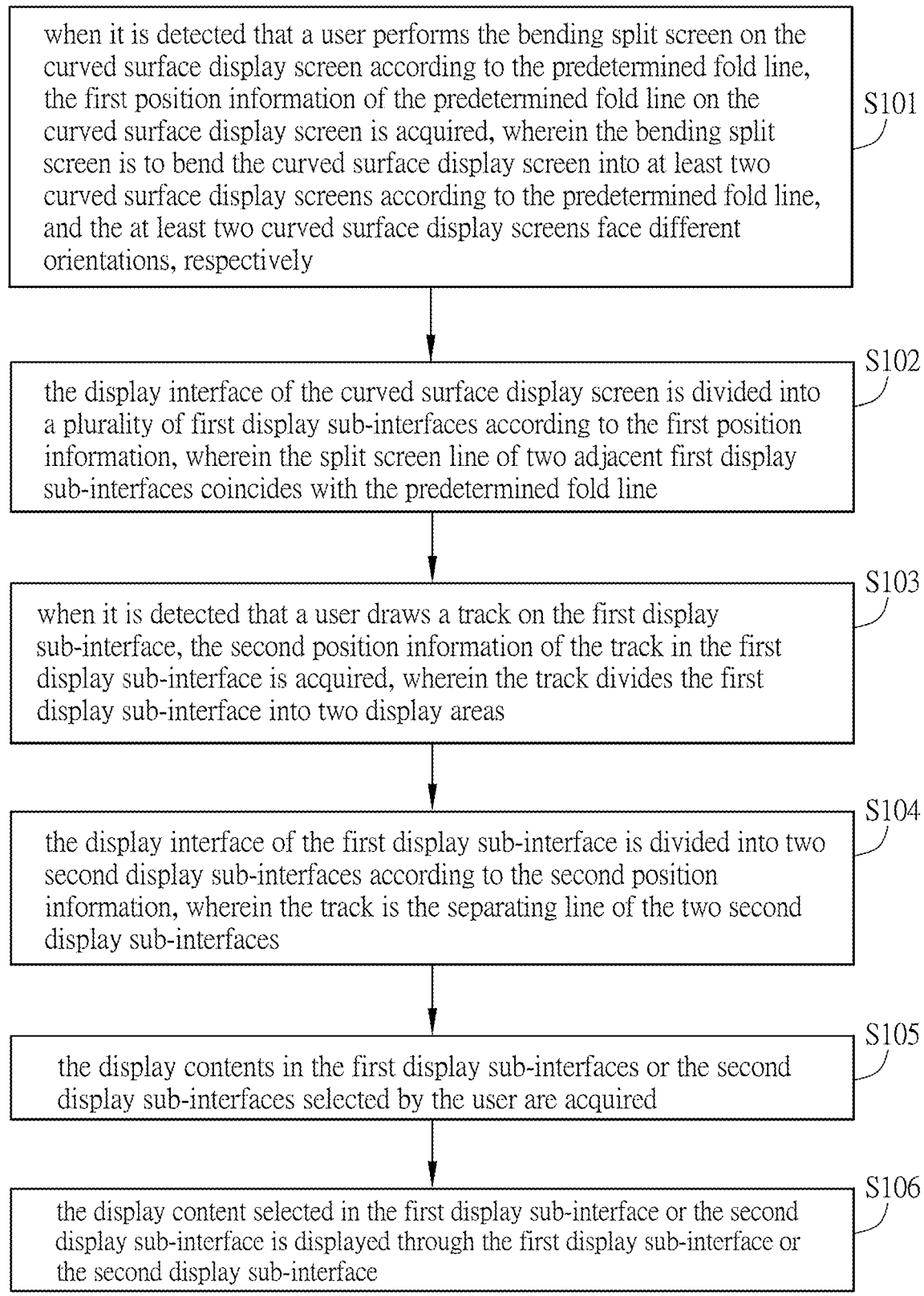
FIG. 1 is a schematic flow chart showing a multi-frame display method provided by the embodiment of this disclosure.

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

In the description of this disclosure, it is to be understood that the terms "center", "transversal", "up," "down," "left," "right," "vertical", "horizontal", "top," "bottom," "inside" and "outside" indicating the orientation or position relationships are the orientation or position relationships based on the drawing, are only provided for the purposes of describing this disclosure and simplifying the description, but do not indicate or imply that the directed devices or elements must have the specific orientations or be constructed and operated in the specific orientations, and thus cannot be understood as the restriction to this disclosure. In addition, the terms "first," and "second" are used for the illustrative purpose only and cannot be understood as indicating or implying the relative importance or implicitly specifying the number of indicated technical features. Therefore, the features restricted by "first" and "second" may expressly or implicitly comprise one or multiple ones of the features. In the description of this disclosure, unless otherwise described, the meaning of "multiple" comprises two or more than two. In addition, the terms "comprises" and any modification thereof intend to cover the non-exclusive inclusions.

In the description of this disclosure, it needs to be described that, unless otherwise expressly stated and limited, the terms "mount," "link" and "connect" should be broadly understood. For example, they may be the fixed connection, may be the detachable connection or may be the integral connection; may be the mechanical connection or may also be the electrical connection; or may be the direct connection, may be the indirect connection through a middle medium or may be the inner communication between two elements. It will be apparent to those skilled in the art that the specific meanings of the above terms in this application may be understood according to the specific conditions.

The terms used herein are for the purpose of describing only specific embodiments and are not intended to limit the exemplary embodiments. Unless the contexts clearly indicate otherwise, the singular form "one," "a" and "an" used here further intend to include plural forms. It should also be understood that the terms "comprising" and/or "including" are used herein to describe the features to describe the presence of stated features, integers, steps, operations, units and/or elements without excluding the presence or addition of one or more other features, integers, steps, operations, units, elements, and/or combinations thereof.

FIG. 1 is a schematic flow chart showing a multi-frame display method provided by the embodiment of this disclosure. Referring to FIG. 1, a multi-frame display method is applied to a display device. The display device includes a curved surface display screen. The curved surface display screen may be bent into a plurality of curved surface display screens through the external force to enable the multi-screen display function. Because a plurality of curved surface display screens face different orientations, respectively, more users can simultaneously watch the display contents facing different orientations. In addition, the curved surface display screen may also enable the multi-frame display function, thereby achieving the effect that the same display interface is used to simultaneously watch different frame contents according to the track that the user touches the display screen, and providing the user with a good operating and viewing experience. As shown in FIG. 1, the multi-frame display method includes steps S101 to S106.

In S101, when it is detected that a user performs the bending split screen on the curved surface display screen according to the predetermined fold line, the first position information of the predetermined fold line on the curved surface display screen is acquired, wherein the bending split screen is to bend the curved surface display screen into at least two curved surface display screens according to the predetermined fold line, and the curved surface display screens face different orientations, respectively.

In the embodiment of this disclosure, when multiple users use the curved surface display screen to watch the frame content, if the users want to use the curved surface display screen to watch the same or different frame contents at the same time, then the curved surface display screen is bent into the curved surface display screens through the external force according to the predetermined fold line to enable the multi-screen display function, wherein the predetermined fold line is a boundary line between the adjacent curved surface display screens formed by bending the split screen.

Figure 2:
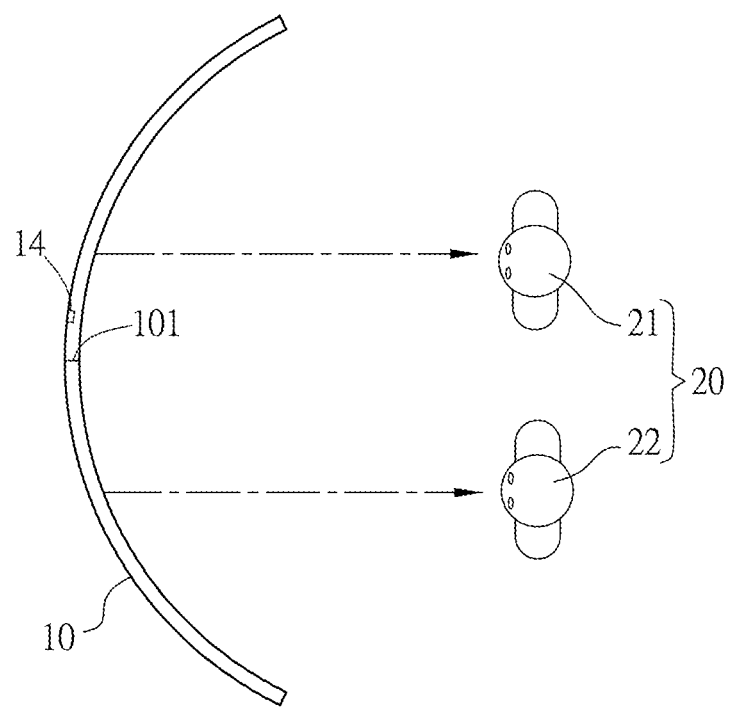
FIG. 2 is a schematic view showing the condition when users watch a curved display screen provided by the embodiment of this disclosure.
Figure 3:
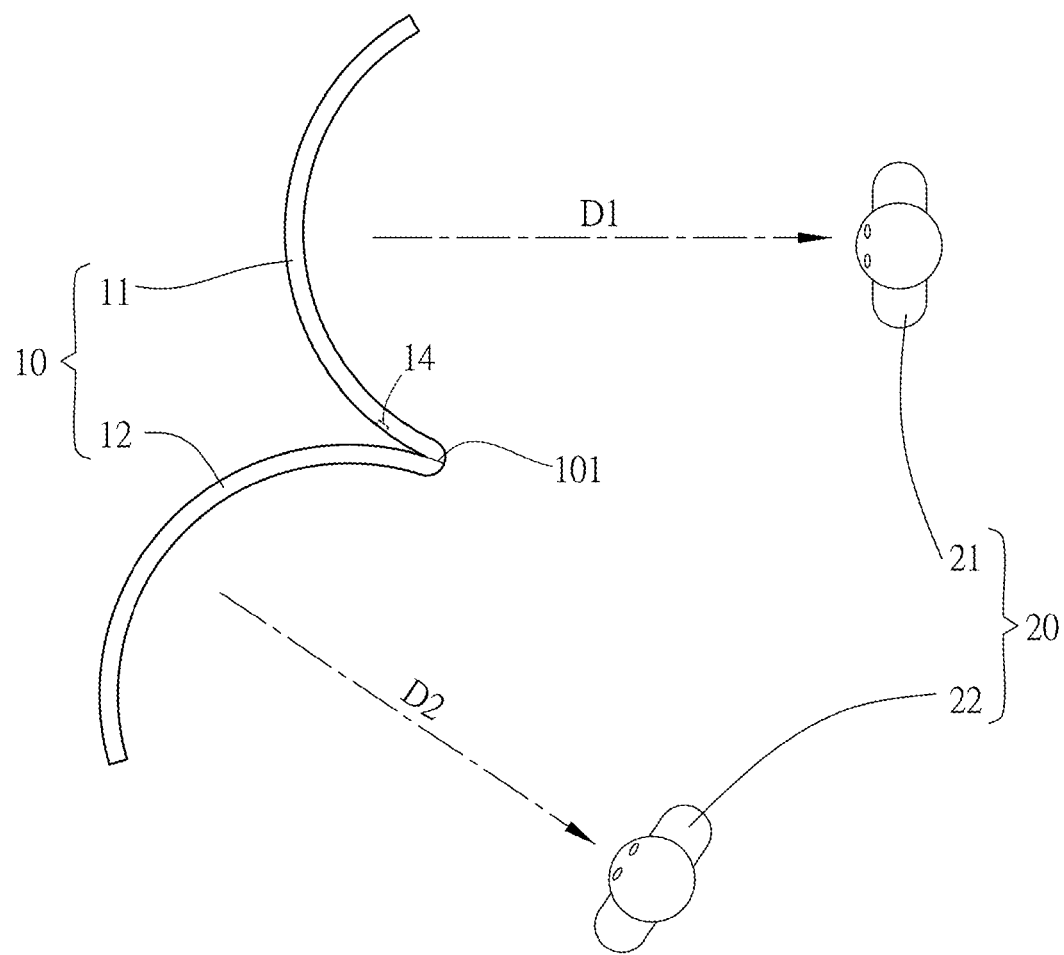
FIG. 3 is a schematic view showing an effect when users use a multi-frame display method to watch a curved surface display screen provided by the embodiment of this disclosure.

Specifically, referring to FIG. 2 and FIG. 3, wherein FIG. 2 is a schematic view showing the condition when users watch a curved display screen provided by the embodiment of this disclosure, and FIG. 3 is a schematic view showing an effect when users use a multi-frame display method to watch a curved surface display screen provided by the embodiment of this disclosure. Referring to FIG. 2, a curved surface display screen 10 is provided with a predetermined fold line 101, a sensor 14 may be disposed adjacently to the predetermined fold line 101, and there may be a plurality of predetermined fold lines 101. When the users 20 (such as a user 21 and a user 22) use the curved surface display screen 10 to watch the programs, the user 21 and the user 22 want to use the curved surface display screen 10 to watch the same or different programs at the same time, the curved surface display screen 10 can be bent and split according to the predetermined fold line 101, and the curved surface display screen 10 can be divided into two curved surface display screens by the predetermined fold line 101. As shown in FIG. 3, the curved surface display screen 10 may be bent according to the predetermined fold line 101, so that the value detected by the sensor 14 disposed adjacently to the predetermined fold line 101 reaches a predetermined threshold value, the multi-screen display function is enabled, the curved surface display screen 10 is divided into a first curved surface display screen 11 and a second curved surface display screen 12 according to the predetermined fold line 101, and the first curved surface display screen 11 and the second curved surface display screen 12 face different orientations, respectively. In other words, the multi-screen display function in this embodiment can be enabled when the value detected by the sensor 14 after bending reaches the predetermined threshold value, so that the curved surface display screen 10 is divided into the first curved surface display screen 11 and the second curved surface display screen 12 facing different orientations according to the predetermined fold line 101. If the value detected by the sensor 14 does not reach the predetermined threshold value, then the multi-screen display function is disabled. Herein, when the multi-screen display function is enabled, the first curved surface display screen 11 and the second curved surface display screen 12 face different orientations. The direction in which the first curved surface display screen 11 faces is a first direction D1, the direction in which the second curved surface display screen 12 faces is a second direction D2, the first direction D1 and the second direction D2 are not parallel, and an included angle between the first direction D1 and the second direction D2 may be greater than, equal to or smaller than 90 degrees.

Figure 4:
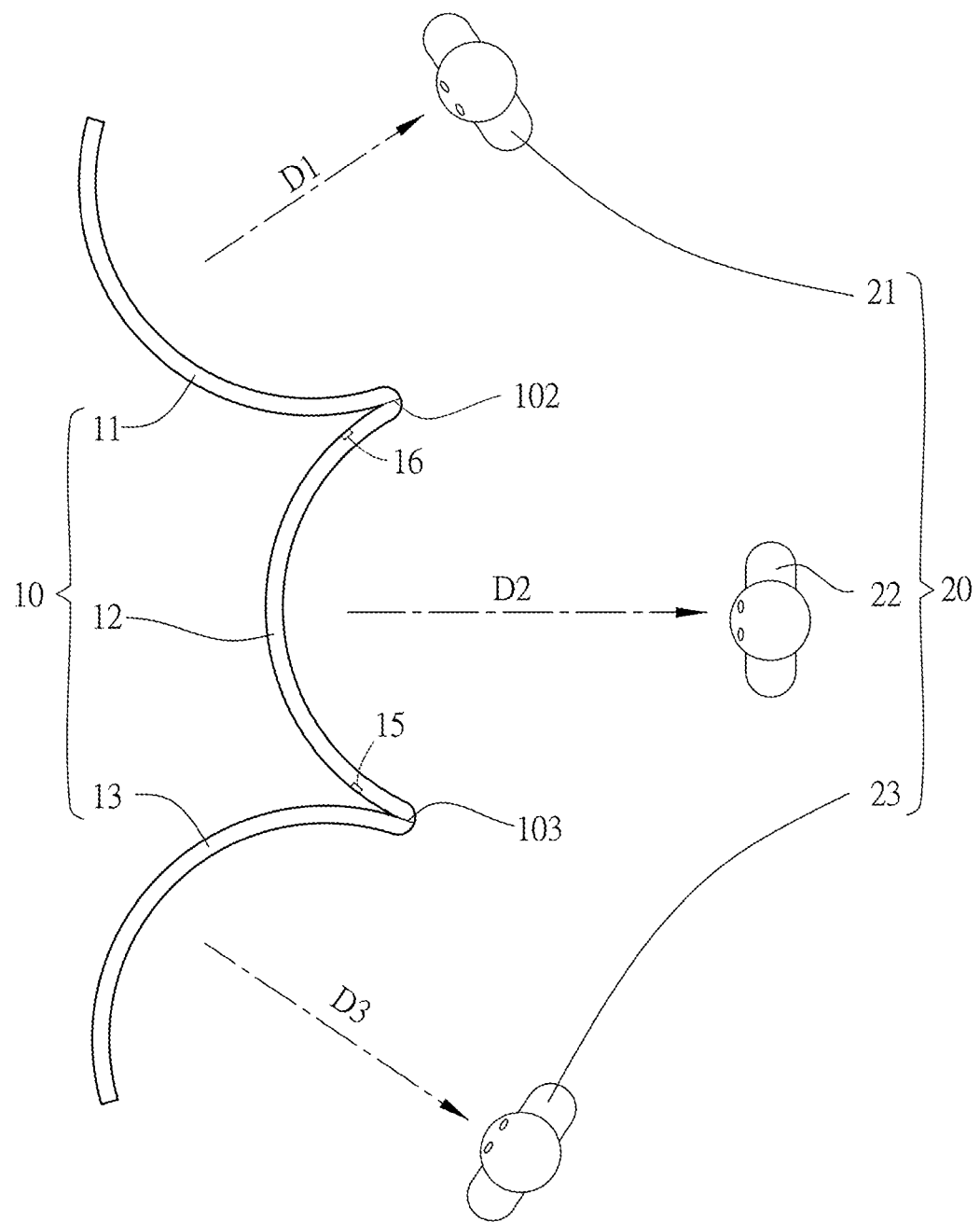
FIG. 4 is a schematic view showing an effect when users use a multi-frame display method to watch a curved surface display screen provided by the embodiment of this disclosure.

When there are a plurality of predetermined fold lines, the curved surface display screen can be divided into a plurality of curved surface display screens using, for example, a second predetermined fold line 102 and a third predetermined fold line 103 shown in FIG. 4. The multi-screen display function can be enabled when the values detected by sensors 15 and 16 reach their corresponding predetermined threshold values, so that the curved surface display screen 10 is divided into the first curved surface display screen 11, the second curved surface display screen 12 and a third curved surface display screen 13 according to the second predetermined fold line 102 and the third predetermined fold line 103, and the first curved surface display screen 11, the second curved surface display screen 12 and the third curved surface display screen 13 face different orientations, respectively. Herein, the direction in which the first curved surface display screen 11 faces is the first direction D1, the direction in which the second curved surface display screen 12 faces is the second direction D2, and the direction in which the third curved surface display screen 13 faces is a third direction D3, the first direction D1, the second direction D2 and the third direction D3 are not parallel each other, and an included angle between any two directions of the first direction D1, the second direction D2 and the third direction D3 may be greater than, equal to or smaller than 90 degrees, but without any restriction.

Specifically speaking, when, it is detected that a user performs the bending split screen on the curved surface display screen according to the predetermined fold line, the detection may be performed by a pressure sensor. For example, the pressure sensor is disposed adjacent to the predetermined fold line. When the pressure value detected by the pressure sensor reaches a certain predetermined pressure threshold value range, it is considered that the user enables the multi-screen display function on the curved surface display screen according to the predetermined fold line, and at least two curved surface display screens face different orientations, respectively. Alternatively, when it is detected that a user performs the bending split screen on the curved surface display screen according to the predetermined fold line, the detection may be performed by a distance sensor, for example, the distance sensors are disposed on the backside of the curved surface display screen and near the predetermined fold line. When the distance between at least two curved surface display screens detected by the distance sensor reaches a predetermined distance threshold value range, it is considered that the user enables the multi-screen display function on the curved surface display screen according to the predetermined fold line, and at least two curved surface display screens face different orientations, respectively. At this time, the first position information of the predetermined fold line on the curved surface display screen is acquired. Specifically, the predetermined fold line includes, but not limited to, a vertical fold line. If the predetermined fold line is the vertical fold line, then the corresponding column pixel unit of the vertical fold line in the curved surface display screen is acquired, wherein the column pixel unit can function as the first position information of the vertical fold line in the curved surface display screen, and the first position information of the predetermined fold line in the curved surface display screen may also be determined through other methods.

In S102, the display interface of the curved surface display screen is divided into a plurality of first display sub-interfaces according to the first position information, wherein the split screen line of two adjacent first display sub-interfaces coincides with the predetermined fold line.

In the embodiment of this disclosure, after the multi-screen display function is enabled, the display interface of the curved surface display screen may be divided into a plurality of first display sub-interfaces facing different directions according to the first position information. Specifically, the display interface of the curved surface display screen 10 is divided into a first display sub-interface of the first curved surface display screen 11 and a first display sub-interface of the second curved surface display screen 12. In addition, the two first display sub-interfaces are independent from each other, may be the scaled down version of the display interface of the original curved surface display screen 10, may also be a new display interface, and may face different directions, respectively. Most important, the split screen line of two adjacent first display sub-interfaces coincides with the predetermined fold line, and the position of the split screen line is determined by the predetermined fold line of the curved surface display screen. Thus, according to the physical split screen of the curved surface display screen (the hardware is bent and divided into multiple display screens), the multi-screen display of the display interface is implemented on the software correspondingly.

In S103, when it is detected that a user draws a track on the first display sub-interface, the second position information of the track in the first display sub-interface is acquired, wherein the track divides the first display sub-interface into two display areas.

In the embodiment of this disclosure, when the user uses the curved surface display screen to watch the frame content, if a certain first display sub-interface is used to watch the same or different frame contents at the same time, then the curved surface display screen can be touched by the user's finger or a touch pen and a track can be drawn on the first display sub-interface, and the track divides the first display sub-interface into two display areas. Herein, the track may be a vertical straight line, a polygonal line, a circular line or an irregular line.

Figure 5:
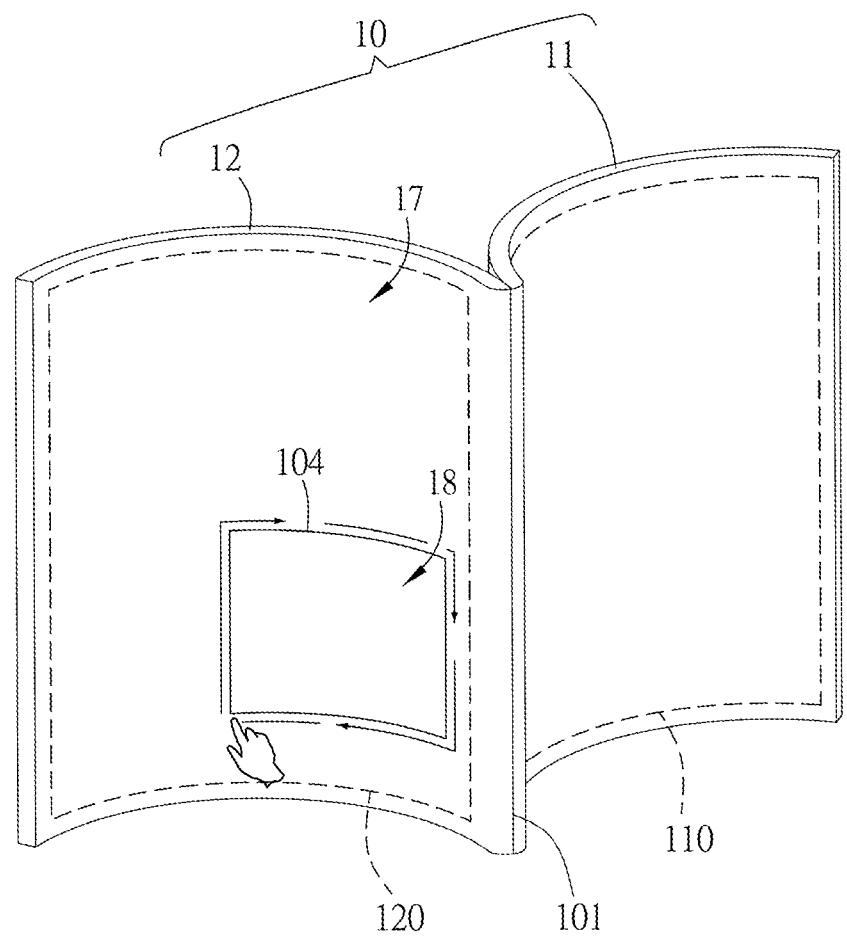
FIG. 5 is a schematic view showing the multi-frame display function used by the embodiment of this disclosure.

FIG. 5 is a schematic view showing the multi-frame display function used by the embodiment of this disclosure. As shown in FIG. 5, when the user wants to use a first display sub-interface 120 to watch the same or different programs at the same time, the user can use the finger (or touch pen) to touch and draw a track 104 on the first display sub-interface 120, and the track 104 can divide the first display sub-interface 120 into two display areas, that is, a first display area 17 and a second display area 18. The track 104 in this example embodiment is a quadrangle. In other embodiments, the track 104 may be a vertical straight line, or any of other shapes.

Specifically speaking, when it is detected that a user splits the screen into display areas on the curved surface display screen according to the track, specifically, the detection may be performed by a touch sensing structure, that is, the curved surface display screen is a touch display screen, the user draws a track on the touch display screen, that is, the first display sub-interface is divided into two display areas according to the track to obtain two second display sub-interfaces. At this time, the second position information of the track in the first display sub-interface (curved surface display screen) is acquired, specifically including acquiring the corresponding pixel unit of the track in the first display sub-interface (curved surface display screen), the pixel units can function as the second position information of the track in the first display sub-interface (curved surface display screen), and the second position information of the track in the first display sub-interface (curved surface display screen) may also be determined through other methods.

In S104, the display interface of the first display sub-interface is divided into two second display sub-interfaces according to the second position information, wherein the track is the separating line of the two second display sub-interfaces.

In the embodiment of this disclosure, the display interface of the first display sub-interface of the curved surface display screen is divided into two second display sub-interfaces according to the second position information. Specifically, the first display sub-interface 120 of the second curved surface display screen 12 is divided into the second display sub-interface of the first display area 17 and the second display sub-interface of the second display area 18. Most importantly, the separating line of the two second display sub-interfaces coincides with the track 104. Correspondingly, the multi-frame display of the display interface is implemented on the software.

In S105, the display contents in the first display sub-interfaces or the second display sub-interfaces selected by the user are acquired.

In the embodiment of this disclosure, the display contents in the first display sub-interfaces or the second display sub-interfaces selected by the user are acquired. Specifically, the users 21 and 22 in different orientations want to watch the same or different frame contents of the first display sub-interfaces 110 and 120 at the same time. After the above-mentioned steps, the users may select the same or different videos or text contents in a first display sub-interface 110 of the first curved surface display screen 11 and a first display sub-interface 120 of the second curved surface display screen 12. For example, the user 21 selects the video A in a first display sub-interface 110 of the first curved surface display screen 11, and the user 22 selects the video B in a first display sub-interface 120 of the second curved surface display screen 12, and the display contents (i.e., the video A and the video B) selected by the users are acquired.

In addition, if the users want to watch the same or different frame contents on the same display interface at the same time, then after the above-mentioned steps, the users may select the same or different videos or text contents in the two second display sub-interfaces of the first display area 17 and the second display area 18 of the second curved surface display screen 12. For example, the video C is selected in the second display sub-interface of the first display area 17 and the video D is selected in the second display sub-interface of the second display area 18, and the display contents (i.e., the video C and the video D, (the video B and the video D may be the same or different)) selected by the users are acquired.

In S106, the display content selected in the first display sub-interface or the second display sub-interface is displayed through the first display sub-interface or the second display sub-interface.

In the embodiment of this disclosure, for example, the user 21 selects the video A in the first display sub-interface 110 of the first curved surface display screen 11, and the video A is displayed through the first display sub-interface 110 of the first curved surface display screen 11. The user 22 selects the video B in the first display sub-interface 120 of the second curved surface display screen 12, and the video B is displayed through the first display sub-interface 120 of the second curved surface display screen 12. Thus, different users can watch different orientations and the same or different display contents through the curved surface display screen and the display interface corresponding to the split screen. Because the display screen corresponding to the predetermined fold line of the curved surface display screen protrudes from the curved surface display screen when it is bent, the predetermined fold line may also be used to block the display content of the first display sub-interface on both sides of the split screen line, and to make the users really enjoy the visual effect of the two screens, unlike the existing split screen technology. This configuration can achieve the effect that different users can use the same display screen to watch different frame contents, which do not interfere with each other.

Because at least two curved surface display screens respectively face different orientations, when there are many users at, for example, a traffic intersection, a concert, an exhibition, or a corner, the curved surface display screens facing different orientations enable more users at different positions to simultaneously watch the same or different display contents facing different directions. This disclosure may be applicable to, for example, a billboard or a display screen of a concert or an exhibition to make more observers clearly watch the different orientations of advertising, singing or exhibition contents, and improve the watching experiences for multiple users while watching at the same time.

In addition, in the embodiment of this disclosure, for example, the video C is selected in the second display sub-interface of the first display area 17, the video D is selected in the second display sub-interface of the second display area 18, and the video C is displayed through the second display sub-interface of the first display area 17. The video D is selected in the second display sub-interface of the second display area 18. Thus, different display contents may watch through the display interface of the second curved surface display screen 12 corresponding to the split screen. The track 104 blocks the display contents of the second display sub-interface on both sides of the boundary line to make the user really enjoy the visual effect of the two display frames, thereby achieving the effect that the same display interface is used to simultaneously watch the same or different frame contents, and providing the user with a good operating and viewing experience.

Figure 6:
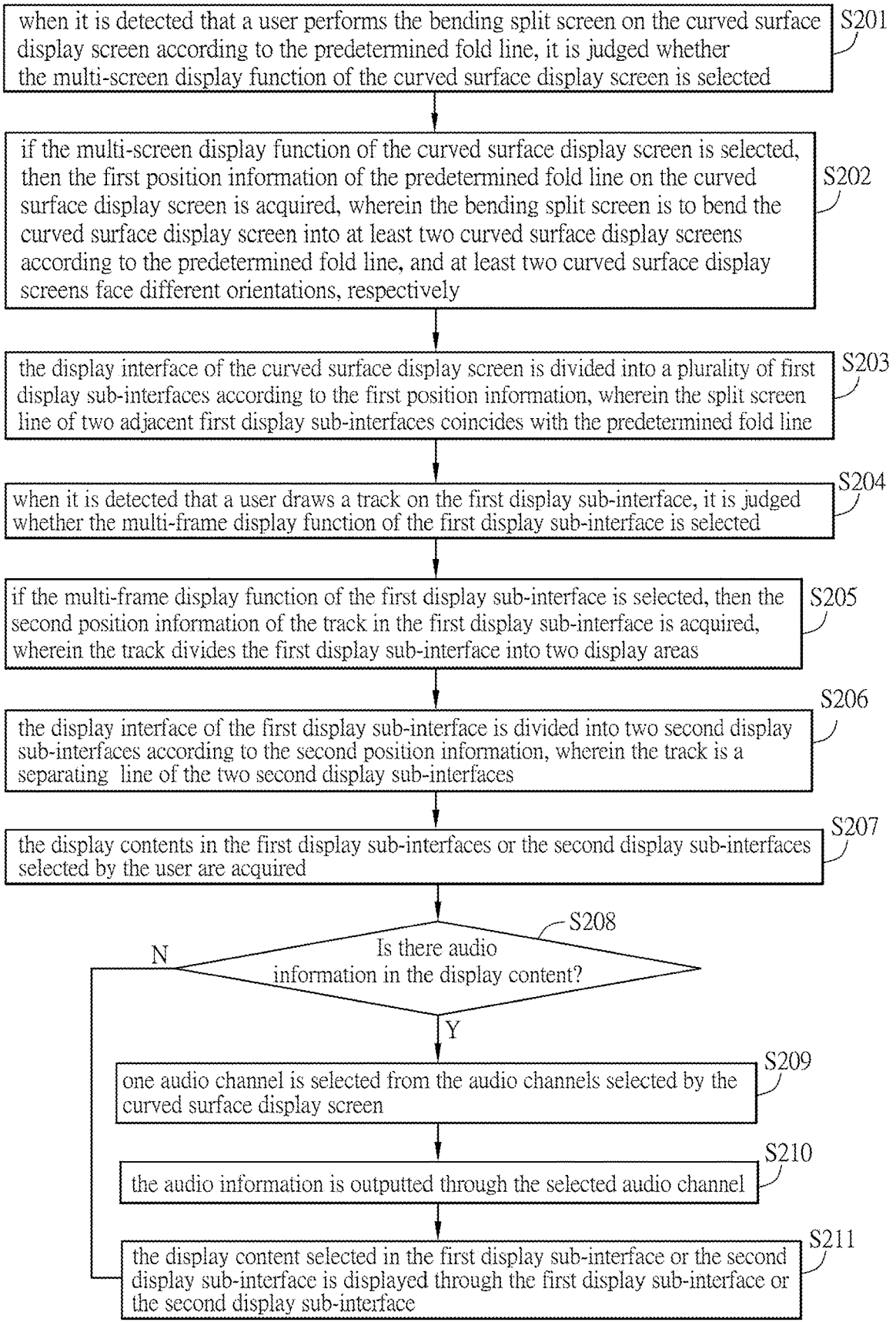
FIG. 6 is another schematic flow chart showing a multi-frame display method provided by the embodiment of this disclosure.

FIG. 6 is another schematic flow chart showing a multi-frame display method provided by the embodiment of this disclosure. Referring to FIG. 6, the multi-frame display method is applied to the display device, the display device includes the curved surface display screen, and the curved surface display screen may be bent into a plurality of curved surface display screens through the external force to enable the multi-screen display function. The curved surface display screens respectively face different orientations to enable more users to simultaneously watch the display contents facing different orientations. In addition, the curved surface display screen may also enable the multi-frame display function, thereby achieving the effect that the same display interface is used to simultaneously watch the same or different frame contents, and providing the user with a good operating and viewing experience. The curved surface display screen is provided with a plurality of audio channels, or the host corresponding to the curved surface display screen includes a plurality of audio channels. As shown in FIG. 6, the multi-frame display method includes steps S201 to S211.

In S201, when it is detected that a user performs the bending split screen on the curved surface display screen according to the predetermined fold line, it is judged whether the multi-screen display function of the curved surface display screen is selected.

In the embodiment of this disclosure, the multi-screen display function of the curved surface display screen may correspond to one split screen key mode, and the split screen key is disposed on the curved surface display screen. After the user performs the bending split screen on the curved surface display screen according to the predetermined fold line, the user is prompted to select the multi-screen display function of the curved surface display screen. For example, the multi-screen display function of the curved surface display screen may be selected by pressing the split screen key, and the curved surface display screens face different orientations, respectively. It is judged whether the multi-screen display function of the curved surface display screen is selected. If the multi-screen display function of the curved surface display screen is selected, then the step S202 is executed. If the multi-screen display function of the curved surface display screen is not selected, then the prompt information is outputted to prompt the user to select the multi-screen display function of the curved surface display screen.

Specifically speaking, when, it is detected that a user performs the bending split screen on the curved surface display screen according to the predetermined fold line, the detection may be performed by a pressure sensor. For example, the pressure sensor is disposed adjacent to the predetermined fold line. When the pressure value detected by the pressure sensor reaches a certain predetermined pressure threshold value range, it is considered that the user enables the multi-screen display function on the curved surface display screen according to the predetermined fold line, and desires to make at least two curved surface display screens face different orientations, respectively. Alternatively, when it is detected that a user performs the bending split screen on the curved surface display screen according to the predetermined fold line, the detection may be performed by a distance sensor, for example, the distance sensors are disposed on the backside of the curved surface display screen and near the predetermined fold line. When the distance between at least two curved surface display screens detected by the distance sensor reaches a predetermined distance threshold value range, it is considered that the user enables the multi-screen display function on the curved surface display screen according to the predetermined fold line, and desires to make at least two curved surface display screens face different orientations, respectively.

In S202, if the multi-screen display function of the curved surface display screen is selected, then the first position information of the predetermined fold line on the curved surface display screen is acquired, wherein the bending split screen is to bend the curved surface display screen into at least two curved surface display screens according to the predetermined fold line, and at least two curved surface display screens face different orientations, respectively.

In the implementation of this disclosure, the first position information of the predetermined fold line (specifically the predetermined fold line) on the curved surface display screen is acquired includes but not limited to a vertical fold line. If the predetermined fold line is the vertical fold line, then the corresponding column pixel unit of the vertical fold line in the curved surface display screen is acquired, the column pixel unit can function as the first position information of the vertical fold line in the curved surface display screen, and the first position information of the predetermined fold line in the curved surface display screen may also be determined through other methods.

In S203, the display interface of the curved surface display screen is divided into a plurality of first display sub-interfaces according to the first position information, wherein the split screen line of two adjacent first display sub-interfaces coincides with the predetermined fold line.

In the embodiment of this disclosure, after the multi-screen display function is enabled, the display interface of the curved surface display screen may be divided into a plurality of first display sub-interfaces facing different directions according to the first position information (see FIG. 3). Specifically, the display interface of the curved surface display screen 10 is divided into a first display sub-interface of the first curved surface display screen 11 and a first display sub-interface of the second curved surface display screen 12. In addition, the two first display sub-interfaces may be the scaled down version of the display interface of the original curved surface display screen 10, may also be a new display interface, and the first curved surface display screen 11 and the second curved surface display screen 12 may face different directions, respectively. Most important, the split screen line of two adjacent first display sub-interfaces coincides with the predetermined fold line, and the position of the split screen line is determined by the predetermined fold line of the curved surface display screen. Thus, according to the physical split screen of the curved surface display screen (the hardware is bent and divided into multiple display screens), the multi-screen display of the display interface is implemented on the software correspondingly.

In S204, when it is detected that a user draws a track on the first display sub-interface, it is judged whether the multi-frame display function of the first display sub-interface is selected.

In the embodiment of this disclosure, the multi-frame display function may correspond to one multi-frame display key mode, and the multi-frame display key is disposed on the curved surface display screen. After the user performs the multi-frame display split screen on the first display sub-interface according to the track, the user is prompted to select the multi-frame display function of the first display sub-interface. For example, the multi-frame display function of the first display sub-interface may be selected by pressing the multi-frame display key. It is judged whether the multi-frame display function of the first display sub-interface is selected. If the multi-frame display function of the first display sub-interface is selected, then the step S205 is executed. If the multi-frame display function is not selected, then the prompt information is outputted to prompt the user to select the multi-frame display function.

In S205, if the multi-frame display function of the first display sub-interface is selected, then the second position information of the track in the first display sub-interface is acquired, wherein the track divides the first display sub-interface into two display areas.

In the implementation of this disclosure, the second position information of the track in the first display sub-interface is acquired, and the corresponding pixel unit of the track in the first display sub-interface (curved surface display screen) is acquired. Specifically, the track may be, for example but not limited to, a vertical straight line, a polygonal line, a circular line or an irregular line. The pixel units can function as the second position information of the track in the curved surface display screen, and the second position information of the track in the curved surface display screen may also be determined through other methods.

In S206, the display interface of the first display sub-interface is divided into two second display sub-interfaces according to the second position information, wherein the track is a separating line of the two second display sub-interfaces.

In the embodiment of this disclosure, the display interface of the first display sub-interface is divided into two second display sub-interfaces according to the second position information (see FIG. 5). Specifically, the first display sub-interface 120 of the second curved surface display screen 12 is divided into the second display sub-interface of the first display area 17 and the second display sub-interface of the second display area 18. Most importantly, the separating line of the two second display sub-interfaces coincides with the track 104. Thus, the division of the display area is performed on the curved surface display screen according to the track drawn by the user. Correspondingly, the multi-frame display of the display interface is implemented on the software.

In S207, the display contents in the first display sub-interfaces or the second display sub-interfaces selected by the user are acquired.

In the embodiment of this disclosure, the display contents in the first display sub-interfaces selected by the user are acquired. Specifically, the users in different orientations want to watch the same or different frame contents of the first display sub-interfaces 110 and 120 at the same time. After the above-mentioned steps, the users may select the same or different videos or text contents in a first display sub-interface 110 of the first curved surface display screen 11 and a first display sub-interface 120 of the second curved surface display screen 12. For example, the user 21 selects the video A in a first display sub-interface 110 of the first curved surface display screen 11, and the user 22 selects the video B in a first display sub-interface 120 of the second curved surface display screen 12, and the display contents (i.e., the video A and the video B) selected by the users are acquired.

In addition, if the users want to watch the same or different frame contents on the same display interface at the same time, then after the above-mentioned steps, the users may select the same or different videos or text contents in the two second display sub-interfaces of the first display area 17 and the second display area 18 of the second curved surface display screen 12. For example, the video C is selected in the second display sub-interface of the first display area 17 and the video D is selected in the second display sub-interface of the second display area 18, and the display contents (i.e., the video C and the video D, (the video B and the video D may be the same or different)) selected by the users are acquired.

In the S208, it is judged whether there is audio information in the display content.

In the embodiment of the disclosure, it is judged whether there is the audio information in the display content, such as the video A, the video B, the video C and the video D. The video A and the video B, and the video C and the video D may have audio information. It is judged whether there is the audio information in the display content, the existing audio information detection methods are applied and not described in detail here. If the display content has the audio information, then the step S209 is executed; and if the display content does not have the audio information, then the step S211 is executed.

In S209, if the display content has the audio information, then one audio channel is selected from the audio channels selected by the curved surface display screen.

In the embodiment of this disclosure, the curved surface display screen uses the audio channels, and the audio channels are independent audio channels, may respectively transmit different audio information at the same time, and different audio channels correspond to different audio apparatuses, such as an earphone interface and a speaker and the like. The earphone interface and the speaker may correspond to more than one, and a plurality of earphone interfaces and a plurality of speakers may be connected to different audio channels, respectively.

In S210, the audio information is outputted through the selected audio channel.

In the embodiment of this disclosure, different audio channels are selected in correspondence with different split screens. The audio information in the display content selected in the split screen is outputted through the audio channel corresponding to the split screen, and the same or different display contents can be watched through the first display sub-interface and/or the second display sub-interface of the curved surface display screen in different orientations, and the audio information corresponding to each of the display contents can be individually listened. Thus, the interference is avoided, and the audio-visual experience when watching is improved.

In S211, the display content selected in the first display sub-interface or the second display sub-interface is displayed through the first display sub-interface or the second display sub-interface.

In the embodiment of this disclosure, for example, the user 21 selects the video A in the first display sub-interface of the first curved surface display screen 11, and the video A is displayed through the first display sub-interface of the first curved surface display screen 11. The user 22 selects the video B in the first display sub-interface of the second curved surface display screen 12, and the video B is displayed through the first display sub-interface of the second curved surface display screen 12. The user 22 selects the video C in the second display sub-interface of the first display area 17 of the first display sub-interface 120, and the video C is displayed through the second display sub-interface of the first display area 17 of the first display sub-interface 120. The user 22 selects the video D in the second display sub-interface of the second display area 18 of the first display sub-interface 120, and the video D is displayed through the second display sub-interface of the second display area 18 of the first display sub-interface 120.

In the embodiment of this disclosure, a physical bending split screen mode is performed on a curved surface display screen according to a predetermined fold line by a user. In software, a display interface split screen corresponding to the physical bending split screen mode is employed to divide the curved surface display screen into a plurality of first display sub-interfaces, and the different first display sub-interfaces may display different contents, thereby achieving the effect that multiple users can watch different frame contents at the same time. In addition, because a plurality of curved surface display screens face different orientations, respectively, more users can simultaneously watch the display contents facing different orientations. This disclosure may be applicable to, for example, a billboard or a display screen of a concert or an exhibition to make more observers clearly watch the different orientations of advertising, singing or exhibition contents, and improve the watching experiences for multiple users while watching at the same time.

In addition, in the embodiment of this disclosure, the multi-frame display method is performed on the first display sub-interface according to the track. In software, a display interface split screen corresponding to the multi-frame display method is employed to divide the first display sub-interface into two second display sub-interfaces, and different second display sub-interfaces display the same or different contents, thereby achieving the effect that the same display interface is used to simultaneously watch different frame contents according to the track that the user touches the display screen, and providing the user with a good operating and viewing experience.

Figure 7:
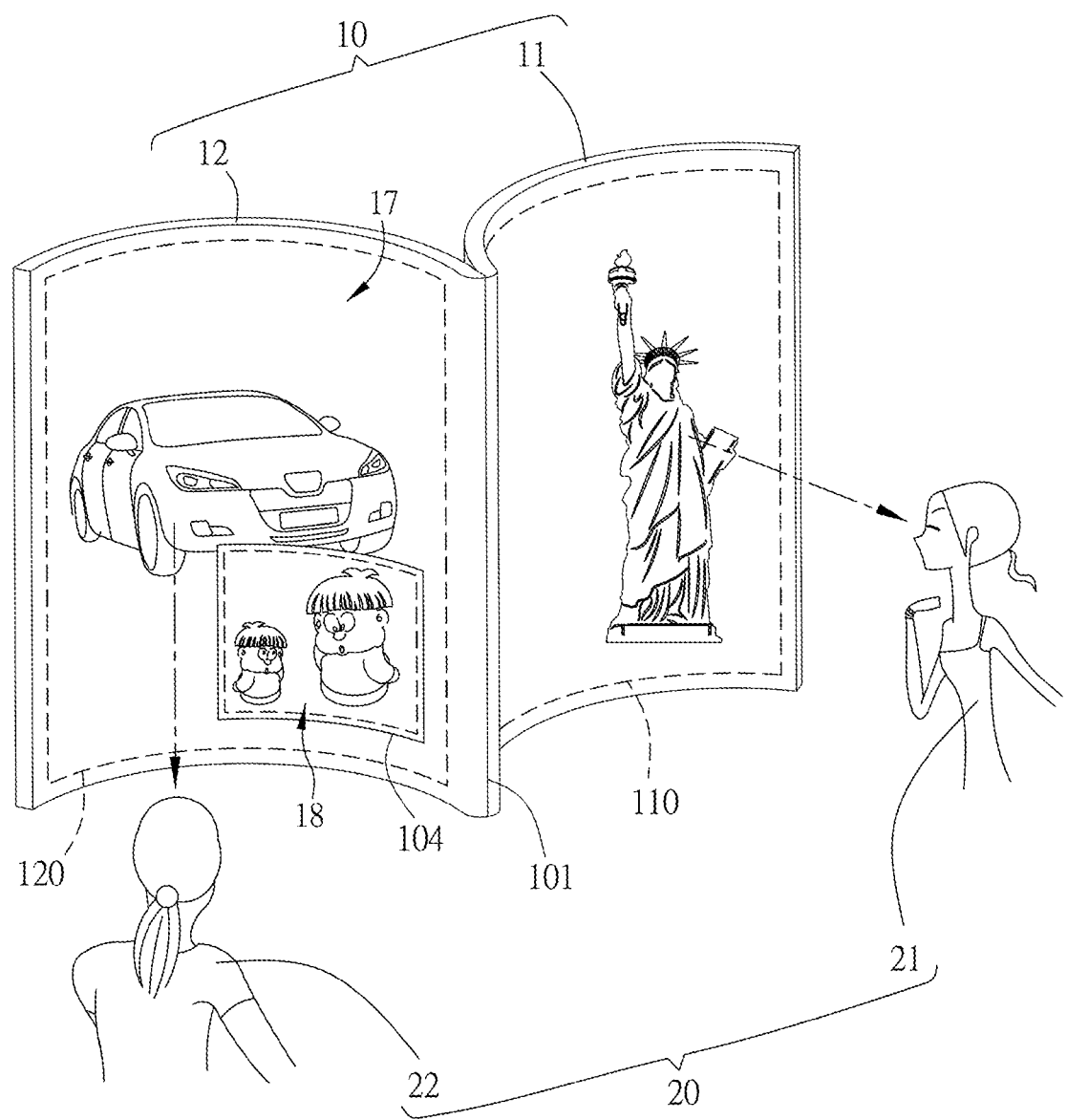
FIG. 7 is a schematic view showing an effect when users use a multi-frame display method to watch a curved surface display screen provided by the embodiment of this disclosure.

FIG. 7 is a schematic view showing an effect when users use a multi-frame display method to watch a curved surface display screen provided by the embodiment of this disclosure. For the specific application scene of the method in the above-mentioned embodiment, referring to FIG. 7, the curved surface display screen 10 may be bent and divided into two curved surface display screens (i.e., the first curved surface display screen 11 and the second curved surface display screen 12) according to the predetermined fold line 101. When the a plurality of users want to respectively watch different programs through the curved surface display screen 10, the external force may be used to enable the multi-screen display function when the curved surface display screen 10 is bent according to the predetermined fold line, the curved surface display screen 10 is divided into the first curved surface display screen 11 and the second curved surface display screen 12 according to the predetermined fold line 101, and the first curved surface display screen 11 and the second curved surface display screen 12 face different orientations, respectively. When the main control unit of the display screen or the host connected to the display screen detects that the multi-screen display function is enabled and the curved surface display screen 10 is divided into the first curved surface display screen 11 and the second curved surface display screen 12, the first position information of the predetermined fold line in the curved surface display screen 10 is acquired, the display interface of the curved surface display screen 10 is divided into the first display sub-interfaces 110 and 120 according to the first position information, and then the display content selected by the user for watching is acquired respectively from the first display sub-interfaces 110 and 120, and the display content is respectively displayed to different users through the first display sub-interfaces 110 and 120, so that the user 21 and the user 22 can enjoy different display contents, for example. Because the physical split screens are respectively combined with the software split screens, the users use the multi-frame display method to watch different display contents, thereby having the effect of watching two independent display screens, and increasing the user's watching experience.

In addition, when the user 22 wants to watch the same or different frames through the first display sub-interface 120, the first display sub-interface 120 may be divided into the first display area 17 and the second display area 18 according to the drawn track 104. When the main control unit of the display screen or the host connected to the display screen detects that the first display sub-interface 120 is divided into the first display area 17 and the second display area 18, the second position information of the track 104 in the first display sub-interface 120 is acquired, the first display sub-interface 120 is divided into two second display sub-interfaces according to the second position information, then the display content selected by the user 22 for watching is acquired respectively from the two second display sub-interfaces, and the display content is respectively displayed to different the user 22 through the two second display sub-interfaces, so that the user 22 can enjoy different display contents. Thus, the user 22 uses the multi-frame display method to watch the same or different display contents, thereby having the effect of watching two independent display screens, and increasing the watching experience of the user 22.

Figure 8:
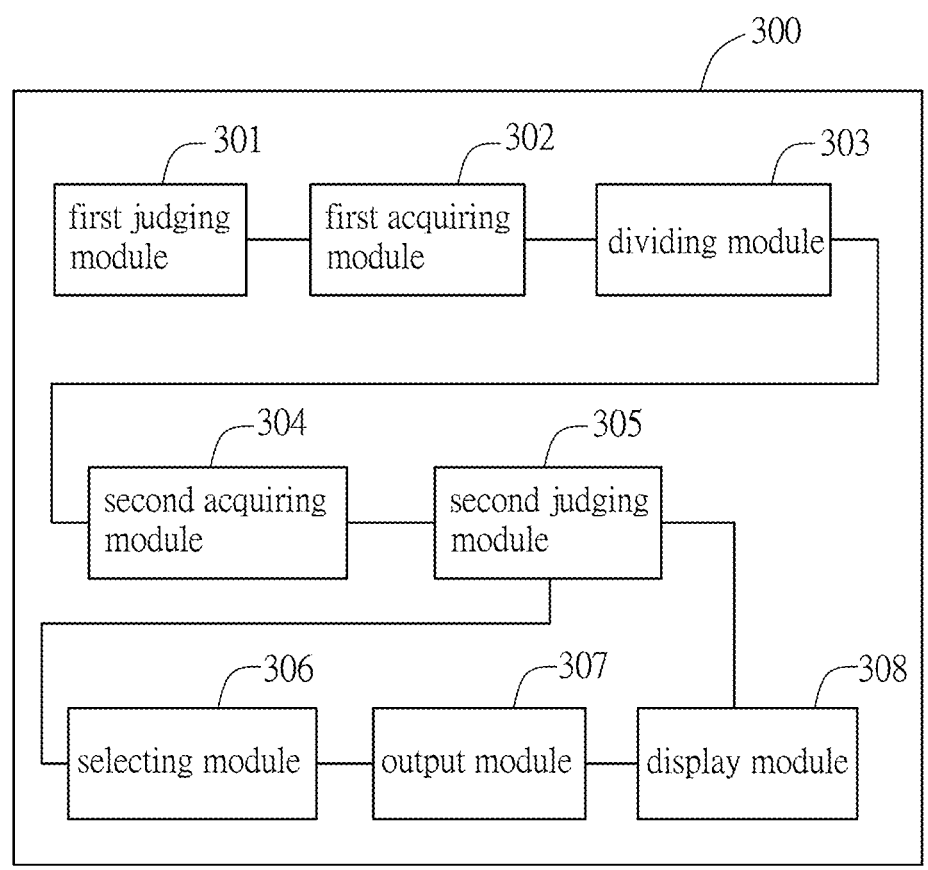
FIG. 8 is a schematic block diagram showing a display device provided by the embodiment of this disclosure.

FIG. 8 is a schematic block diagram showing a display device provided by the embodiment of this disclosure. Referring to FIG. 8, the display device includes the curved surface display screen, the curved surface display screen may be bent into a plurality of curved surface display screens through the external force to enable the multi-screen display function, and the curved surface display screens face different orientations, respectively to enable more users to simultaneously watch the display contents facing different orientations. In addition, the curved surface display screen may also enable the multi-frame display function, thereby achieving the effect that the same display interface is used to simultaneously watch the same or different frame contents, and providing the user with a good operating and viewing experience. As shown in FIG. 8, a display device 300 includes a first judging module 301, a first acquiring module 302, a dividing module 303, a second acquiring module 304, a second judging module 305, a selecting module 306, an output module 307 and a display module 308.

The first judging module 301 judges whether the multi-screen display function of the curved surface display screen is selected when it is detected that a user performs the bending split screen on the curved surface display screen according to the predetermined fold line. The multi-screen display function of the curved surface display screen may correspond to one split screen key mode, and the split screen key is disposed on the curved surface display screen. After the user performs the bending split screen on the curved surface display screen according to the predetermined fold line, the user is prompted to select the multi-screen display function of the curved surface display screen. For example, the multi-screen display function of the curved surface display screen may be selected by pressing the split screen key. In addition, the first judging module 301 also judges whether the multi-frame display function of the curved surface display screen is selected. In the embodiment, the multi-frame display function may correspond to one multi-frame display key mode, and the multi-frame display key is disposed on the curved surface display screen. After the user performs the multi-frame display split screen on the first display sub-interface according to the track, the user is prompted to select the multi-frame display function of the first display sub-interface. For example, the multi-frame display function of the first display sub-interface may be selected by pressing the multi-frame display key.

The first acquiring module 302 acquires the first position information of the predetermined fold line on the curved surface display screen when it is detected that a user performs the bending split screen on the curved surface display screen according to the predetermined fold line, wherein the bending split screen is to bend the curved surface display screen into at least two curved surface display screens according to the predetermined fold line, and at least two curved surface display screens face different orientations, respectively. The first acquiring module also detects that when the user draws a track on the first display sub-interface of the curved surface display screen, the second position information of the track in the first display sub-interface is acquired, wherein the track divides the first display sub-interface into two display areas.

The first acquiring module specifically acquires the corresponding column pixel unit of the vertical fold line in the curved surface display screen. The first position information of the predetermined fold line on the curved surface display screen is acquired. Specifically, the predetermined fold line includes, but not limited to, a vertical fold line. If the predetermined fold line is the vertical fold line, then the corresponding column pixel unit of the vertical fold line in the curved surface display screen is acquired, the column pixel unit can function as the first position information of the vertical fold line in the curved surface display screen, and the first position information of the predetermined fold line in the curved surface display screen may also be determined through other methods. Specifically speaking, when, it is detected that a user performs the bending split screen on the curved surface display screen according to the predetermined fold line, the detection may be performed by a pressure sensor. For example, the pressure sensor is disposed adjacent to the predetermined fold line. When the pressure value detected by the pressure sensor reaches a certain predetermined pressure threshold value range, it is considered that the user enables the multi-screen display function on the curved surface display screen according to the predetermined fold line, and desires to make at least two curved surface display screens face different orientations, respectively. Alternatively, when it is detected that a user performs the bending split screen on the curved surface display screen according to the predetermined fold line, the detection may be performed by a distance sensor, for example, the distance sensors are disposed on the backside of the curved surface display screen and near the predetermined fold line. When the distance between at least two curved surface display screens detected by the distance sensor reaches a predetermined distance threshold value range, it is considered that the user enables the multi-screen display function on the curved surface display screen according to the predetermined fold line, and desires to make at least two curved surface display screens face different orientations, respectively.

In addition, the first acquiring module 302 specifically acquires the corresponding pixel unit of the track in the curved surface display screen (first display sub-interface). Specifically, the second position information of the track in the curved surface display screen is acquired, and the corresponding pixel unit of the track in the first display sub-interface is acquired. Specifically, the track may be, for example but not limited to, a vertical straight line, a polygonal line, a circular line or an irregular line. The pixel units can function as the second position information of the track in the curved surface display screen (first display sub-interface), and the second position information of the track in the curved surface display screen may also be determined through other methods.

The dividing module 303 divides the display interface of the curved surface display screen into a plurality of first display sub-interfaces according to the first position information, wherein the split screen line of two adjacent first display sub-interfaces coincides with the predetermined fold line. The dividing module 303 further divides the display interface of the first display sub-interface into two second display sub-interfaces according to the second position information, wherein the track is a separating line of the two second display sub-interfaces.

Specifically, referring to FIG. 5, for example, the display interface of the curved surface display screen 10 is divided into the first display sub-interface of the first curved surface display screen 11 and the first display sub-interface of the second curved surface display screen 12, wherein the first curved surface display screen 11 and the second curved surface display screen 12 face different orientations, respectively. In addition, specifically, the first display sub-interface of the second curved surface display screen 12 is divided into the second display sub-interface of the first display area 17 and the second display sub-interface of the second display area 18, for example.

The second acquiring module 304 acquires the display contents in the first display sub-interfaces or the second display sub-interfaces selected by the user. Specially, for example, the user 21 selects the video A in the first display sub-interface 110 of the first curved surface display screen 11, and the user 22 selects the video B in the second display sub-interface 120 of the second curved surface display screen 12, so that the display contents (video A and B) selected by the users are acquired. In addition, the user 22 selects the video B in the second display sub-interface of the first display area 17 of the second curved surface display screen 12, and the video D in the second display sub-interface of the second display area 18 of the second curved surface display screen 12, so that the display contents (video B and D) selected by the users are acquired.

The second judging module 305 judges whether there is audio information in the display content. The existing audio information detection methods are applied. If the display content has the audio information, then the selecting module 306 is adopted. If the display content does not have the audio information, then the display module 308 is adopted.

The selecting module 306 selects one audio channel from the audio channels selected by the curved surface display screen if the display content has the audio information. The curved surface display screen uses the audio channels, and the audio channels are independent audio channels, may respectively transmit different audio information at the same time, and different audio channels correspond to different audio apparatuses, such as an earphone interface and a speaker and the like.

The output module 307 outputs the audio information through the selected audio channel Specifically, different audio channels are selected in correspondence with different split screens. The audio information in the display content selected in the split screen is outputted through the audio channel corresponding to the split screen, and the same or different display contents can be watched through the first display sub-interface and/or the second display sub-interface of the curved surface display screen in different orientations, and the audio information corresponding to each of the display contents can be individually listened. Thus, the interference is avoided, and the audio-visual experience when watching is improved. In addition, the same or different display contents can be watched through different display areas of the first display sub-interface of the curved surface display screen, and the audio information corresponding to each of the display contents can be individually listened. Thus, the interference is avoided, and a good operating and viewing experience can be provided to the user.

The display module 308 displays the display content selected in the first display sub-interface or the second display sub-interface through the first display sub-interface. For example, the user 21 selects the video A in the first display sub-interface of the first curved surface display screen 11, and the video A is displayed through the first display sub-interface of the first curved surface display screen 11; and the user 22 selects the video B in the first display sub-interface of the second curved surface display screen 12, and the video B is displayed through the first display sub-interface of the second curved surface display screen 12. In addition, the user 22 again selects the video D in the second display area 18 of the first display sub-interface 120 of the second curved surface display screen 12, and the video D is displayed through the second display area 18 of the first display sub-interface 120 of the second curved surface display screen 12.

In the embodiment of this disclosure, a physical bending split screen mode is performed on a curved surface display screen according to a predetermined fold line by a user. In software, a display interface split screen corresponding to the physical bending split screen mode is employed to divide the curved surface display screen into a plurality of first display sub-interfaces, and the different first display sub-interfaces may display the same or different contents, thereby achieving the effect that multiple users can watch the same or different frame contents at the same time. In addition, because at least two curved surface display screens face different orientations, respectively, more users can simultaneously watch the display contents facing different orientations. This disclosure may be applicable to, for example, a billboard or a display screen of a concert or an exhibition to make more observers clearly watch the different orientations of advertising, singing or exhibition contents, and improve the watching experiences for multiple users while watching at the same time.

In addition, in the embodiment of this disclosure, the multi-frame display method is performed on the curved surface display screen according to the drawn track through the user touching the curved surface display screen. In software, a display interface split screen corresponding to the multi-frame display method is employed to divide the first display sub-interface into two second display sub-interfaces, and different second display sub-interfaces display the same or different contents, thereby achieving the effect that the same display interface is used to simultaneously watch different frame contents according to the track that the user touches the display screen, and providing the user with a good operating and viewing experience.

Those skilled in the art may clearly understand that, for convenience and conciseness of description, a specific work process of the above-mentioned device and module may refer to a corresponding process in the above-mentioned method embodiments, and detailed descriptions thereof will be omitted.

The steps in the method of the embodiments of the present application may be sequentially adjusted, merged, and deleted according to actual needs.

The units or modules in the terminal in the embodiment of this disclosure may be combined, divided, and deleted according to actual needs.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A multi-frame display method applied to a display device including a curved surface display screen, comprising:

performing a first detection to detect whether a user applies a bending input that splits the curved surface display screen into a plurality of display surfaces respectively facing different orientations according to a predetermined fold line;

when the display surfaces respectively facing different orientations are detected, acquiring a first position information of the predetermined fold line on the curved surface display screen;

dividing a display interface of the curved surface display screen into a plurality of first display sub-interfaces according to the first position information, wherein a split screen line of the first display sub-interfaces coincides with the predetermined fold line;

performing a second detection to detect whether the user draws a track on one of the first display sub-interfaces to divide the one of the first display sub-interfaces into two second display sub-interfaces;

when the track on the one of the first display sub-interfaces is detected, acquiring a second position information of the track in the one of the first display sub-interfaces;

dividing the one of the first display sub-interfaces into two second display sub-interfaces according to the second position information, wherein the track is a separating line of the two second display sub-interfaces;

acquiring display contents in the first display sub-interfaces or the second display sub-interfaces selected by the user; and displaying the display content selected in the first display sub-interface or the second display sub-interface through the first display sub-interface or the second display sub-interface.

2. The multi-frame display method according to claim 1, wherein before acquiring the first position information of the predetermined fold line on the curved surface display screen, further comprising:

determining whether a multi-screen display function of the curved surface display screen is selected; and when the multi-screen display function of the curved surface display screen is selected, performing the first detection.

3. The multi-frame display method according to claim 1, wherein the predetermined fold line is a vertical fold line, and the display screen corresponding to the predetermined fold line protrudes from the curved surface display screen.

4. The multi-frame display method according to claim 3, wherein the step of acquiring the first position information of the predetermined fold line on the curved surface display screen comprises: acquiring a corresponding column pixel unit of the vertical fold line in the curved surface display screen.

5. The multi-frame display method according to claim 1, wherein the first detection is performed by a sensor.

6. The multi-frame display method according to claim 5, wherein the sensor is a pressure sensor or a distance sensor.

7. The multi-frame display method according to claim 1, wherein before the step of acquiring the second position information of the track in the first display sub-interface, further comprising:

determining whether a multi-frame display function of the first display sub-interface is selected; and when the multi-frame display function of the first display sub-interface is selected, performing the second detection.

8. The multi-frame display method according to claim 7, wherein the step of acquiring the second position information of the track in the one of the first display sub-interfaces comprises acquiring a corresponding pixel unit of the track in the one of the first display sub-interfaces.

\* \* \* \* \*